United States Patent
Kunert et al.

(10) Patent No.: US 8,698,806 B2
(45) Date of Patent: Apr. 15, 2014

(54) SYSTEM AND METHOD FOR PERFORMING VOLUME RENDERING USING SHADOW CALCULATION

(75) Inventors: Thomas Kunert, Dresden (DE); Harald Schneider, Frankfurt-Hoechst (DE)

(73) Assignee: Maxon Computer GmbH, Friedrichsdorf (DE)

( * ) Notice: Subject to any disclaimer, the term of this patent is extended or adjusted under 35 U.S.C. 154(b) by 792 days.

(21) Appl. No.: 12/614,466

(22) Filed: Nov. 9, 2009

(65) Prior Publication Data

US 2011/0109631 A1    May 12, 2011

(51) Int. Cl.
| | |
|---|---|
| G06T 15/00 | (2011.01) |
| G06T 15/50 | (2011.01) |
| G06T 15/10 | (2011.01) |
| G09G 5/00 | (2006.01) |
| G06K 9/00 | (2006.01) |
| G06K 9/36 | (2006.01) |
| G06F 3/048 | (2013.01) |
| A63F 9/24 | (2006.01) |
| A61B 5/05 | (2006.01) |
| A61B 6/00 | (2006.01) |
| A61B 8/00 | (2006.01) |

(52) U.S. Cl.
USPC ........... 345/426; 345/419; 345/427; 345/582; 345/619; 382/128; 382/131; 382/132; 382/276; 715/848; 463/32; 600/407; 600/410; 600/425; 600/436; 600/437

(58) Field of Classification Search
USPC ......... 345/419, 420, 423–427, 581–588, 619; 382/128, 131, 132, 154, 276, 277, 285, 382/305; 715/764, 781, 782, 848–852; 463/30–34; 600/300, 407, 410–423, 600/425–429, 436, 437–461; 703/6, 11
See application file for complete search history.

(56) References Cited

U.S. PATENT DOCUMENTS

| | | | |
|---|---|---|---|
| 5,986,662 A * | 11/1999 | Argiro et al. ................... 345/424 |
| 6,771,263 B1 * | 8/2004 | Behrens et al. ............... 345/424 |
| 6,839,462 B1 * | 1/2005 | Kitney et al. .................. 382/173 |
| 6,888,916 B2 * | 5/2005 | Launay et al. ..................... 378/8 |
| 2007/0002047 A1 * | 1/2007 | Desgranges et al. .......... 345/426 |
| 2007/0075998 A1 * | 4/2007 | Cook et al. ..................... 345/426 |
| 2007/0230765 A1 * | 10/2007 | Wang et al. ................... 382/132 |
| 2008/0117204 A1 * | 5/2008 | Thorn ............................ 345/419 |
| 2008/0150937 A1 * | 6/2008 | Lundstrom et al. ........... 345/419 |
| 2009/0318800 A1 * | 12/2009 | Gundel et al. ................. 600/425 |

* cited by examiner

Primary Examiner — Wesner Sajous
Assistant Examiner — Andrew Shin
(74) Attorney, Agent, or Firm — Andrew Wilford (57) ABSTRACT

A method and a system are provided for performing volume rendering a 3D array of image data to produce images with an increased spatial information and thus increase the usefulness of the generated images.

29 Claims, 9 Drawing Sheets

SYSTEM AND METHOD FOR PERFORMING VOLUME RENDERING USING SHADOW CALCULATION

FIELD OF THE INVENTION

The present invention relates generally to the field of volume rendering, and more particularly, to a system and method for performing real time volume rendering of a 3D array of image including shadow calculation.

BACKGROUND OF THE INVENTION

Volume rendering is the standard visualization method for viewing two-dimensional (2D) representations of three-dimensional (3D) data sets. A big driving force in the volume rendering field is medical imaging. This is due to the fact that, without the 3D visualization technology, a doctor would is have to estimate the size and the shape of an organ from a plurality of 2D images, obtained by traditional medical scanners, so as to "conceive" the three-dimensional geometrical location of a pathological tissue, which results in difficulty in therapy.

Medical scanners measure three-dimensional space as a structured three-dimensional grid, and this has led researchers to focus mostly on volume rendering techniques based on structured, rectilinear two-dimensional (2D) grids. These grids are often called slices. A 3D volume array of data, which is typically used in volume rendering, is assembled using a series of consecutive slices through a solid body part being scanned. Each grid value of a 2D image array is called a picture element, or "pixel", while each grid value of a 3D volume array is called a volume element, or "voxel". The acquisition of a 3D volume array is known in the art and is readily obtainable using systems such as computed tomography (CT) scanning system, helical CT, x-ray, positron emission tomographic (PET), fluoroscopic, confocal microscopic, ultrasound, magnetic resonance (MR) imaging system, etc.

As an example of the advancement in data acquisition methods, OCT (optical coherence tomography) is an optical signal acquisition and processing method allowing extremely high-quality, micrometer-resolution, three-dimensional images from within optical scattering media (e.g., biological tissue) to be obtained. In contrast to other optical methods, OCT, an interferometric technique typically employing near-infrared light, is able to penetrate significantly deeper into the scattering medium, for example ~3x deeper than its nearest competitor, confocal microscopy. Depending on the use of high-brightness and wide-spectrum light sources such as superluminescent diodes or ultrashort pulse lasers, OCT has achieved sub-micrometer resolution (with very wide-spectrum sources emitting over a ~100 nm wavelength range). OCT systems, which are commercially available, are finding diverse application in areas such as diagnostic medicine, notably in ophthalmology where it permits remarkable non-invasive images to be obtained from within the retina. In addition, OCT has been actively applied to the field of art conservation and archaeology and has become a new tool for non-invasive examinations of a wide range of museum objects. The more advanced version of OCT technology, spectral-domain optical coherence tomography (SD-OCT), provides even a higher resolution. In the field of ophthalmology, SD-OCT offers a level of detail that parallels—and even enhances the histological observation of retinal integrity.

Improvements in the data acquisition methods, however, are unfortunately not accompanied with improvements in the associated imaging softwares. The SD-OCT units, which are currently available on the market, include 3D OCT-1000 (Topcon), Cirrus HD-OCT (Carl Zeiss Meditec), Spectralis OCT (Heidelberg Engineering), RTVue-100 (OptoVue) and 3D SD-OCT (Bioptigen, Inc). These hardwares are only equipped with imaging softwares which are unable to reconstruct the obtained 2D data into a 3D image in a way that the enhanced capabilities SD-OCT's can be fully taken advantage of. In other words, the subtle changes in the structure and sometimes the function of the scanned object, which are inherent in the scanned data, are easily lost when they are visualized in 3D. This is due to the fact the images these systems create are of low signal-to-noise ratio. Even though these images can be of very high contrast, due to the fact that the slices, which are used to generate these images, can have more or less the same noise distribution, it is difficult for the user to see the topology of the objects (e.g. holes) as one cannot distinguish between the front slice and the slice in the back. The resulted uniform images prevent the medical experts from immediate detection of morphological changes of a tissue of interest.

As a result, there is need for a volume rendering technique that increases the quality of a volume rendered image and maximizes the information, especially the impression of surface topology from the generated image.

SUMMARY OF THE INVENTION

It is therefore an object of the present invention to overcome the foregoing by providing a method and system for performing volume rendering a 3D array of image data to produce images with an increased spatial information and thus increase the usefulness of the generated images.

This goal is achieved in particular by integrating shadow calculation in the volume rendering method. Shadows convey a large amount of information of an object. Without shadows, the images appear two-dimensional, and depth comparisons can be misleading. In a shaded system, a light is traced onto each voxel and the shadow it throws on each voxel in the data set behind it is being determined. Consequently, an increased impression of surface topology can be attained in the reconstructed data.

According to the present invention, a method for performing a volume rendering of a 3D array of image data using shadow calculation is provided, which comprises the steps of: receiving the 3D array of image data; determining a viewing direction and the positions of one or more light sources; slicing the array of image data into a plurality of new slices, wherein the slices are either perpendicular to the viewing direction or perpendicular to the bisecting line between the viewing direction and the light direction or perpendicular to the bisecting line between the mirrored viewing direction and the light direction; calculating shadows, wherein the position of a light source being used is either fixed or movable; rendering the new slices with a volume rendering method, wherein the volume rendering method is one of the methods including ray casting; and displaying the rendered data on a screen. These steps are not necessarily performed in the order as described.

The method further comprises acquiring the 3D array of image data. The 3D array of the image data is acquired by one of the techniques including a computed tomographic (CT), helical CT, optical coherence tomography (OCT), spectral-domain optical coherence tomography (SD-OCT), x-ray, positron emission tomographic (PET), fluoroscopic, confocal microscopic, ultrasound, or magnetic resonance (MR) imaging technique.

As a further advantageous feature of the current invention, the colors of a selected gradient are mapped to the grey scale values of the original images during rendering of the new slices.

The image data loaded for volume rendering can be in different formats such as DICOM, Movies or Image sequences, while the rendered data can be displayed as a real time monoscopic view, a real time stereoscopic view, a movie or a still image.

As described above, shadow calculation plays an important role in visualizing the obtained 2D data in a way such that more spatial information of the scanned object can be obtained. Various shadow algorithms have been developed in the past.

In one embodiment of the current invention, OpenGL is used to generate shadows. In this case, shadow maps can be used with the present invention. Shadow maps are very fast to calculate on the graphics card and can be calculated for each frame during the movement of the light source. This allows for an interactive feedback during the movement of the light source.

In another embodiment of the present invention, ray tracing is used to calculate shadows during volume rendering when the light source is fixed. Ray tracing provides a realistic simulation of lighting, and effects such as reflections and shadows, which are difficult to simulate using other algorithms, are a natural result of the ray tracing algorithm. The shadow quality ray tracing renders is much better than shadows generated by OpenGL. In principal, ray tracing can be used when the light source moves, but the calculation takes too long on current systems to get good frame rates.

According to the present invention, OpenGL can be first used to generate shadows when the light is being moved around before an optimal position is found. As soon as the light source stops moving, high quality ray traced shadows are calculated upfront and "baked" into the data set. Baking means that the ray traced shadow are calculated and then stored in the data set. During rendering, these stored values are used instead of them being calculated again. As long as the light source does not move, even if the camera moves, these values can always be re-presented during rendering.

When OpenGL will be used for shadow calculation with the light source being movable, the array of image data is being sliced into a plurality of new slices in a way such that the new slices are perpendicular to the bisecting line between the camera and the light source. On the other hand, when ray traced shadow are used, the new slices are created to be perpendicular to the viewing direction. The new slides have to be recalculated every time when the camera moves.

Usually only one light source is possible for rendering OpenGL shadows. More than one light source can be used for raytraced shadows. However, the number of light sources is limited by the memory of the graphics card.

The above mentioned shadow functions can of course be turned off when such improved spatial information is not particularly desired.

Boolean operations can be used for modifying the slices. Boolean operations modify the volume by removing parts of the volume. This is mainly used to cut into the volume parallel to one of the sides of a cube, but every form and direction can be used to cut into the volume, e.g. one can "drill" a hole into the volume or only display the parts of the volume that are inside a sphere.

As another advantageous feature of the present invention, the user can interact with the system by a user interface which enables him to change the viewing direction (camera), to move the light source, to adjust parameters like colors, quality, etc. and to measure the size of the object. Furthermore, certain parameters including the position of the light source and the viewing direction can be set by presets to allow a quick access to predefined parameter sets, like camera and light positions. All parameters can be animated and such animations can also be stored in presets to allow for functions such as automated turntable animations.

When the user interacts with the scene, e.g. moving the camera or the light source, the number of the new slices is dynamically adapted to reach a defined frame rate, which is defined by the system. As soon as the interactions stops, the maximum number of slices gets rendered, even if the frame rate is not reached. This feature of dynamic re-slicing is an important aspect of the current invention. It enables the user to smoothly work with the data. The movement of the camera or the light source must be smooth, otherwise it would be almost impossible for the user to move them to a desired position. Therefore, the frame rate plays an important role here in order to accomplish an optimal interaction between the user and the system. If the frame rate is too low, moving the camera or light source can become extremely difficult, as the positions jump too much between two frames. A high frame rate with real time shadows makes it easier to position the light source correctly, as the user more or less sees the final result (but maybe not in the final quality) during interaction. The real time movement of the object provides better feedback to the user, as humans are good in detecting different movement speed of objects and mapping them to depth. Together with the integration of shading, highlights and shadows, an enhancement of the impression of the topology can be achieved.

The fact that the shadow calculation methods of the system can be switched according to the actions of the user is another very valuable feature of the present invention. When the user moves the light source and wishes to follow the effect in real time, OpenGL shadow will be generated by the system. OpenGL calculates shadow in a very time efficient manner, however the quality of the shadow it generates is relatively poor, but good enough for the user to select an optimal position for the light source. As soon as the light source is fixed, high quality ray tracing shadows are calculated and integrated (baked) into the dataset which is used for rendering. Since ray tracing shadow calculation needs longer time and it is too slow for real time display on current systems, the result of the calculation is usually saved, so that, as long as the light source does not move, the calculated shadow values can always be reused.

In one preferred embodiment of the invention, the input data are first subjected to filtering as a pre-processing step. Smoothing filters, sharpening filters, edge enhancement filters can be implemented in order to enhance the quality of the final image.

It is further advantageous to implement tracking, e.g. 2D feature tracking, either alone or in combination with filtering, on the input 3D array of image data, before other steps are being carried out, to detect and reduce scanning errors including translation and rotation.

The present invention can not only display volume data, but can also be combined with traditional polygon rendering. Polygon rendering is used to add things like: surround cube, surfaces, reference image, etc. The combination of volume rendering with polygon rendering enables an integration of further information and objects into the scene, and in the context of medical imaging, it presents more information to the doctors.

The present invention further provides a system for performing the above-described method. The system comprises:

a memory device for storing a program; at least one processor in communication with the memory device, at least one processor operative with the program to receive the 3D array of image data; to determine a viewing direction and the positions of one or more light sources; to slice the array of image data into a plurality of new slices, wherein the slices are either perpendicular to the viewing direction or perpendicular to the bisecting line between the viewing direction and the light direction or perpendicular to the bisecting line between the mirrored viewing direction and the light direction; to calculate shadows, wherein the position of a light source being used is either fixed or movable; to render the new slices with a volume rendering method, wherein the volume rending method is one of the methods including ray casting and texture based volume rendering. In addition, the system also contains a display in communication with the processor(s) for displaying the rendered data.

The processor is a Graphics Processing Unit (GPU) and/or a central processing unit (CPU). Both GPU and CPU can be used for calculation. Calculations can be done, however, much faster on GPU than on CPU.

The processor is further operative with the program code to map the colors of a selected gradient to the grey scale values of the original images during rendering of the new slices.

The viewing direction, the position of the light source and other parameters including colors and desired quality of the final presentation can be determined and adjusted by the user through a user interface. These parameters can in addition be set by presets, as described above, fixed and animated parameter presets, to allow for functions such as automated turntable animations. In addition, the user is able to measure the size of the object. Boolean operations are used for modifying slices. The number of the new slices is adapted to reach a defined frame rate.

OpenGL or ray tracing is used to generate shadows. The data rendered are displayed as a real time monoscopic view, a real time stereoscopic view, a movie or a still image.

The processor(s) is further operative with the program code to acquire the 3D volume of image data. The 3D volume of image data are acquired by one of the techniques including a computed tomographic (CT), helical CT, optical coherence tomography (OCT), spectral-domain optical coherence tomography (SD-OCT), x-ray, positron emission tomographic (PET), fluoroscopic, confocal microscopic, ultrasound, and magnetic resonance (MR) imaging technique. The image data loaded for volume rendering can be in different formats, such as DICOM, Movies, Image sequences.

The processor(s) is further operative with the program code to subject the input 3D array of image data filtering to enhance the quality of the presentation. Moreover, the processor(s) is operative with the program code to subject the input 3D array of image data to tracking, such as 2D Feature tracking, to detect and reduce scanning errors including translation and rotation.

Furthermore, the present invention provides a computer program product comprising a computer readable medium having computer program logic recorded thereon for performing a volume rendering of a 3D array of image data. The computer program logic comprises: program code for receiving the 3D array of image data; program code for determining a viewing direction and the positions of one or more light sources; program code for slicing the array of image data into a plurality of new slices, wherein the slices are either perpendicular to the viewing direction or perpendicular to the bisecting line between the viewing direction and the light direction or perpendicular to the bisecting line between the mirrored viewing direction and the light direction; program code for calculating shadows, wherein the position of a light source being used is either fixed or movable; program code for rendering the new slices with a volume rendering method, wherein the volume rendering method is one of the methods including ray casting volume rendering; program code for displaying the rendered data on a screen.

Moreover, the present invention provides a computer-based system for performing a volume rendering of a 3D array of image data, comprising: means for receiving the 3D array of image data; means for determining a viewing direction and the positions of one or more light sources; means for slicing the array of image data into a plurality of new slices, wherein the slices are either perpendicular to the viewing direction or perpendicular to the bisecting line between the viewing direction and the light direction or perpendicular to the bisecting line between the mirrored viewing direction and the light direction; means for calculating shadows, wherein the position of a light source being used is either fixed or movable; means for rendering the new slices with a volume rendering method, wherein the volume rendering method is one of the methods including ray casting and texture based volume rendering; means for displaying the rendered data on a screen.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF THE PREFERRED EMBODIMENTS

Figure 1:
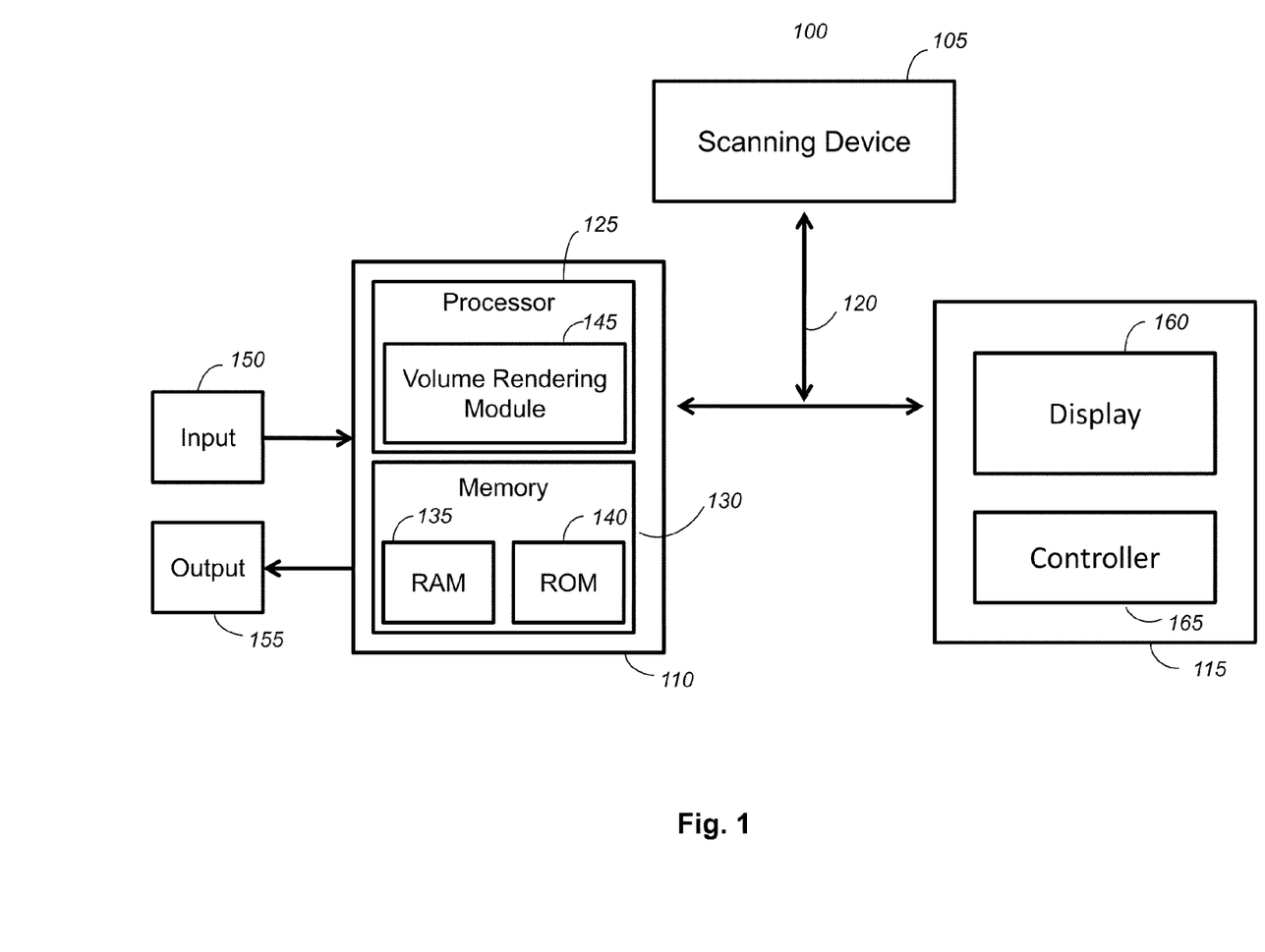
FIG. 1 is a block diagram of a system for performing a volume rendering of a 3D array of image data using shadow calculation according to an illustrated embodiment of the present invention.
Figure 2:
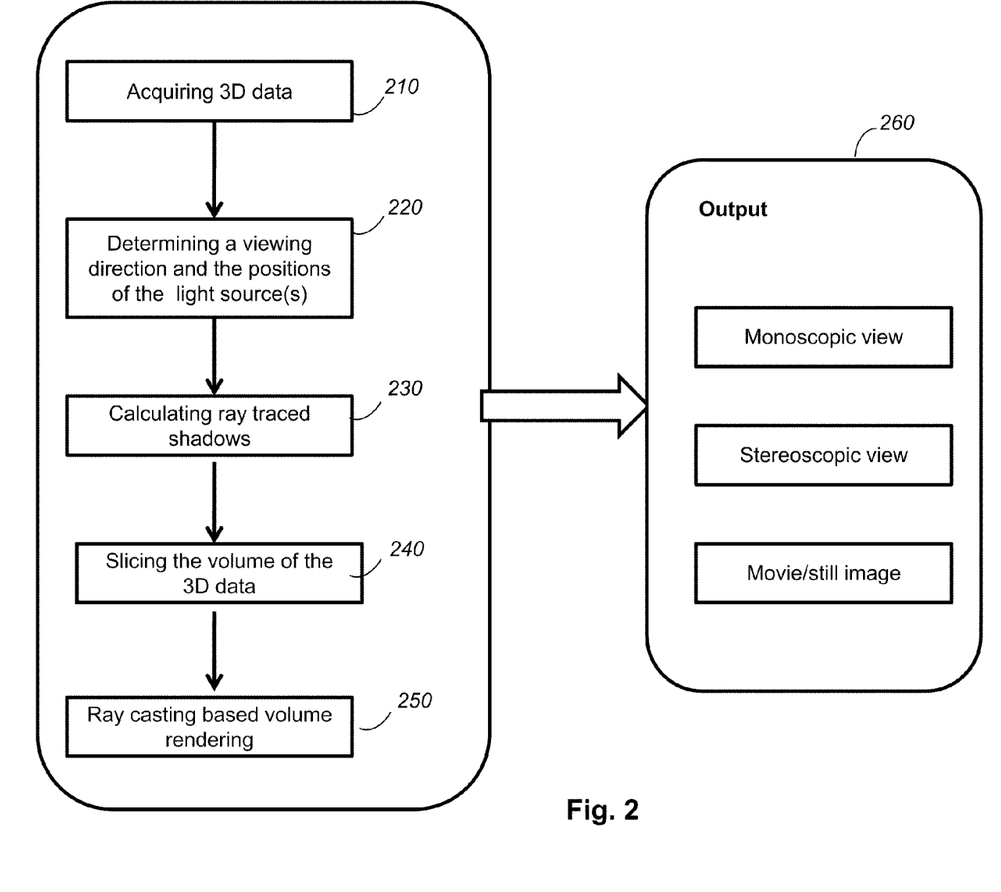
FIG. 2 is a flowchart showing an operation of a method for performing a volume rendering of a 3D array of image data using shadow calculation according to an illustrated embodiment of the present invention.

FIG. 1 is a block diagram of a system 100 for performing a volume rendering of a 3D array of image data using shadow calculation according to an illustrated embodiment of the present invention. As illustrated in FIG. 2, the system 100 includes, inter alia, a scanning device 105, a personal computer (PC) 110 and an operator's console 115 connected over a network 120. The scanning device 105 can be a computed tomographic (CT) device, a helical CT device, an optical coherence tomography (OCT) device, a spectral-domain optical coherence tomography (SD-OCT) device, an x-ray device, a positron emission tomographic (PET) device, a fluoroscopic imaging device, a confocal microscopic imaging device, an ultrasound imaging device, and magnetic resonance (MR) imaging device, etc.

The PC 110 includes a processor 125, which is preferably a graphics processing unit, and a memory 130. They are connected to an input 150 and an output 155. The processor 125 includes a volume rendering module 145 that includes one or more methods for performing volume rendering of a 3D array of image data using shadow calculation.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the processor 125 and is used as a work area. The ROM 140 functions as a program memory for storing a program executed in the CPU 125. The input 150 is constituted by a keyboard, mouse, etc., and the output 155 is constituted by a display, printer, etc.

The operation of the system 100 is controlled from the operator's console 115, which includes a controller 165, for example, a keyboard, and a display 160, for example, a cathode ray tube (CRT) display. The operator's console 115 communicates with the PC 110 and the scanning device 105 so that 2D image data collected by the scanning device 105 can be rendered into 3D data by the PC 110 and viewed on the display 160. It is to be understood that the PC 110 can be configured to operate and display information provided by the scanning device 105 absent from the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160 using, for example, a 3D graphics card.

As shown in FIG. 1, the volume rendering module 145 is also used by the PC 110 to receive and process digital image data, which may be in the form of raw image data, 2D reconstructed data (e.g. axial slices), or 3D reconstructed data such as volumetric image data or multi-planar reformats, or any combination of such formats. The data processing results can be output from the PC 110 via the network 120 to an image rendering system in the operator's console 115 for generating 2D and/or 3D rendering of image data in accordance with the data processing results, such as segmentation of organs, or anatomical structures, color or intensity variation, and so forth.

FIG. 2 is a flowchart showing an operation of a method for performing a volume rendering of a 3D array of image data using shadow calculation according to an illustrated embodiment of the present invention. As shown in FIG. 2, 3D array of image data is acquired, which can be, for example, an anatomical body part (step 210). A viewing direction and the positions of one or more light sources are then determined (step 220). Ray traced shadow is being calculated with the position of a light source being fixed (step 230) and the values can be stored for further usage as long as the position of the light source does not change. The array of image data is then sliced into a plurality of new slices (step 240). The resulted new slices are perpendicular to the viewing direction. In step 250, the new slices are rendered with ray casting volume rendering method and the rendered data are displayed on a screen (step 260), wherein the rendered data can be displayed as a real time monoscopic view, a real time stereoscopic view, a movie or a still image.

Figure 3:
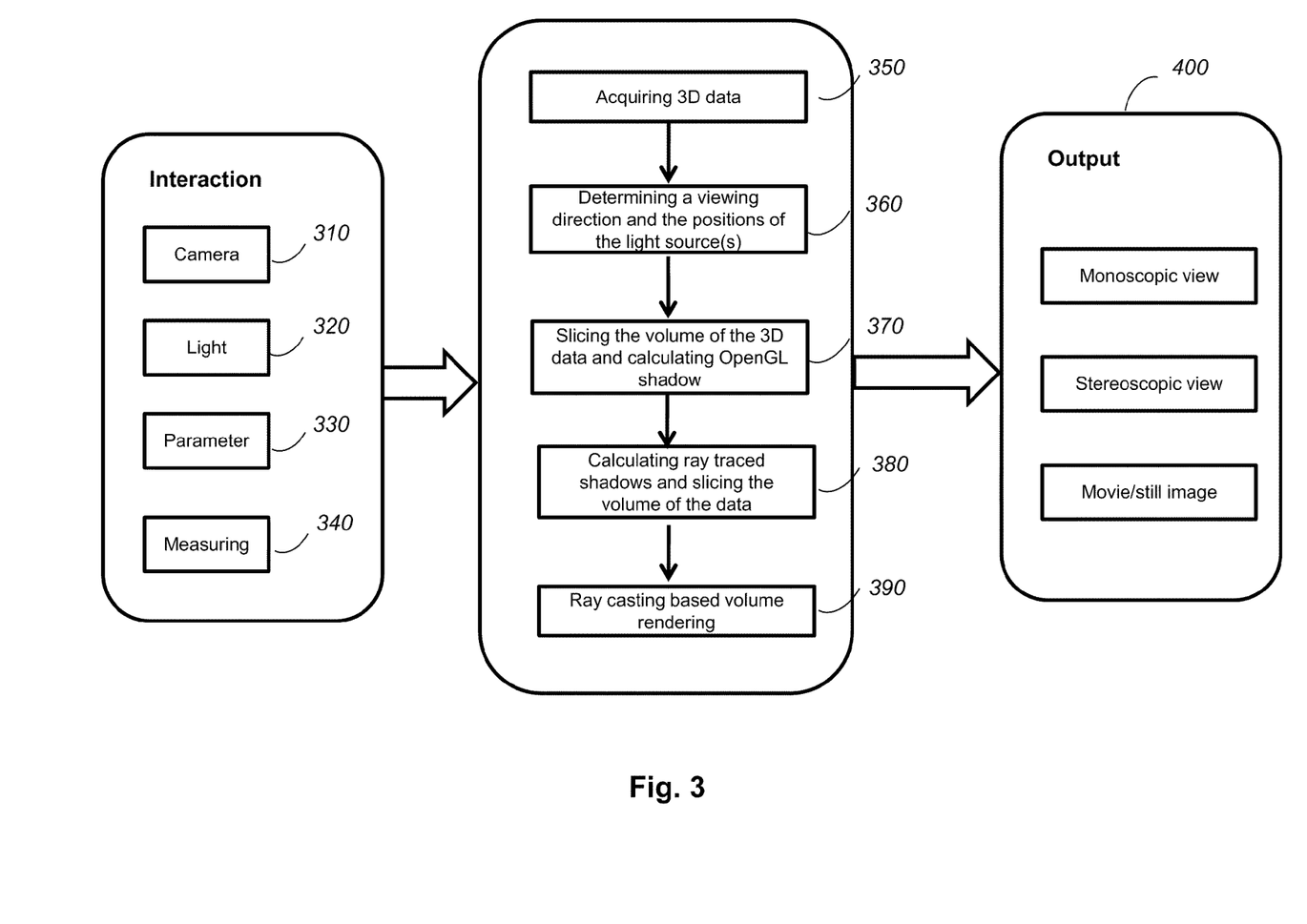
FIG. 3 is a flowchart showing an operation of a method for performing a volume rendering of a 3D array of image data using shadow calculation according to another illustrated embodiment of the present invention.

FIG. 3 is a flowchart showing an operation of a method for performing a volume rendering of a 3D array of image data using shadow calculation according to another illustrated embodiment of the present invention. In this embodiment, the user is able to interact with the system via a user interface to change the viewing direction (camera) (310), to move the light source (320), to adjust parameters (330) like colors, quality, etc. and to measure the size of the object (340). When the user moves the light source around (320), the array of image data is being sliced into a plurality of new slices (370) in a way such that the new slices are perpendicular to the bisecting line between the camera and the light source. It is to be understood that, when the angle between the camera/viewing direction and the light source is larger than 90°, then the new slices are created to be perpendicular to the bisecting line between the mirrored viewing direction (180° to the original viewing direction) and the light source. OpenGL shadows are then generated (370), the quality of which is low but high enough for determination of an optimal position of the light source. After the optimal position of the light source is established, ray traced shadows are calculated and integrated into the data set (380) and the array of image data is sliced in a different fashion, so that the resulted new slices are perpendicular to the viewing direction. It is to be understood that during the movement of the light source, the number of the slices from the array of the image data is dynamically adjusted in order to reach as high as possible a frame rate.

Figure 4:
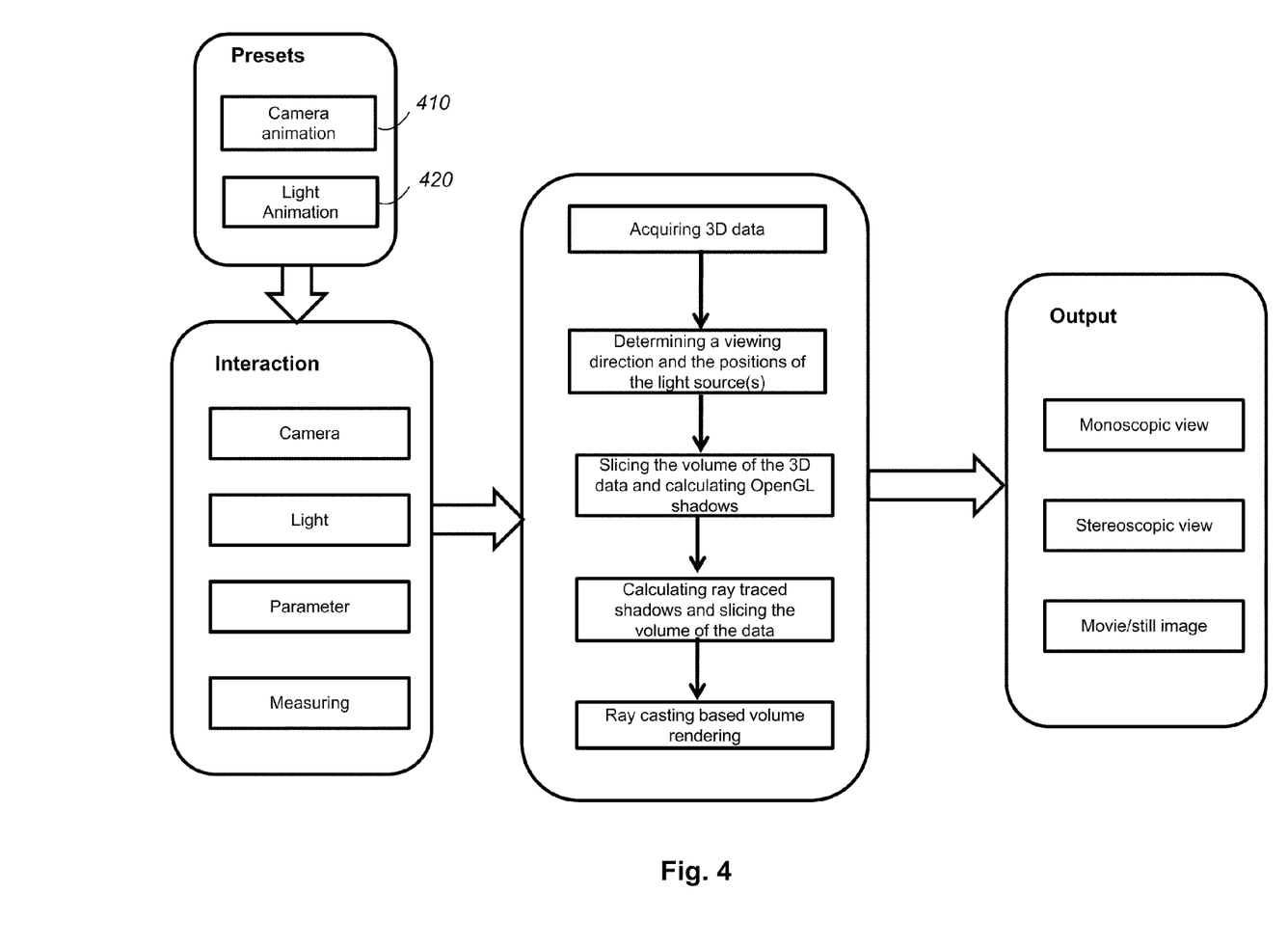
FIG. 4 is a flowchart showing an operation of a method for performing a volume rendering of a 3D array of image data using shadow calculation according to yet another illustrated embodiment of the present invention.

FIG. 4 is a flowchart showing an operation of a method for performing a volume rendering of a 3D array of image data is using shadow calculation according to yet another illustrated embodiment of the present invention. In this particular example, certain parameters including the position of the light source (420) and the viewing direction (410) can be set by presets to allow for functions such as automated turntable animations. The rest of the steps, which are not numerated, are identical with the steps in FIG. 3.

Figure 5:
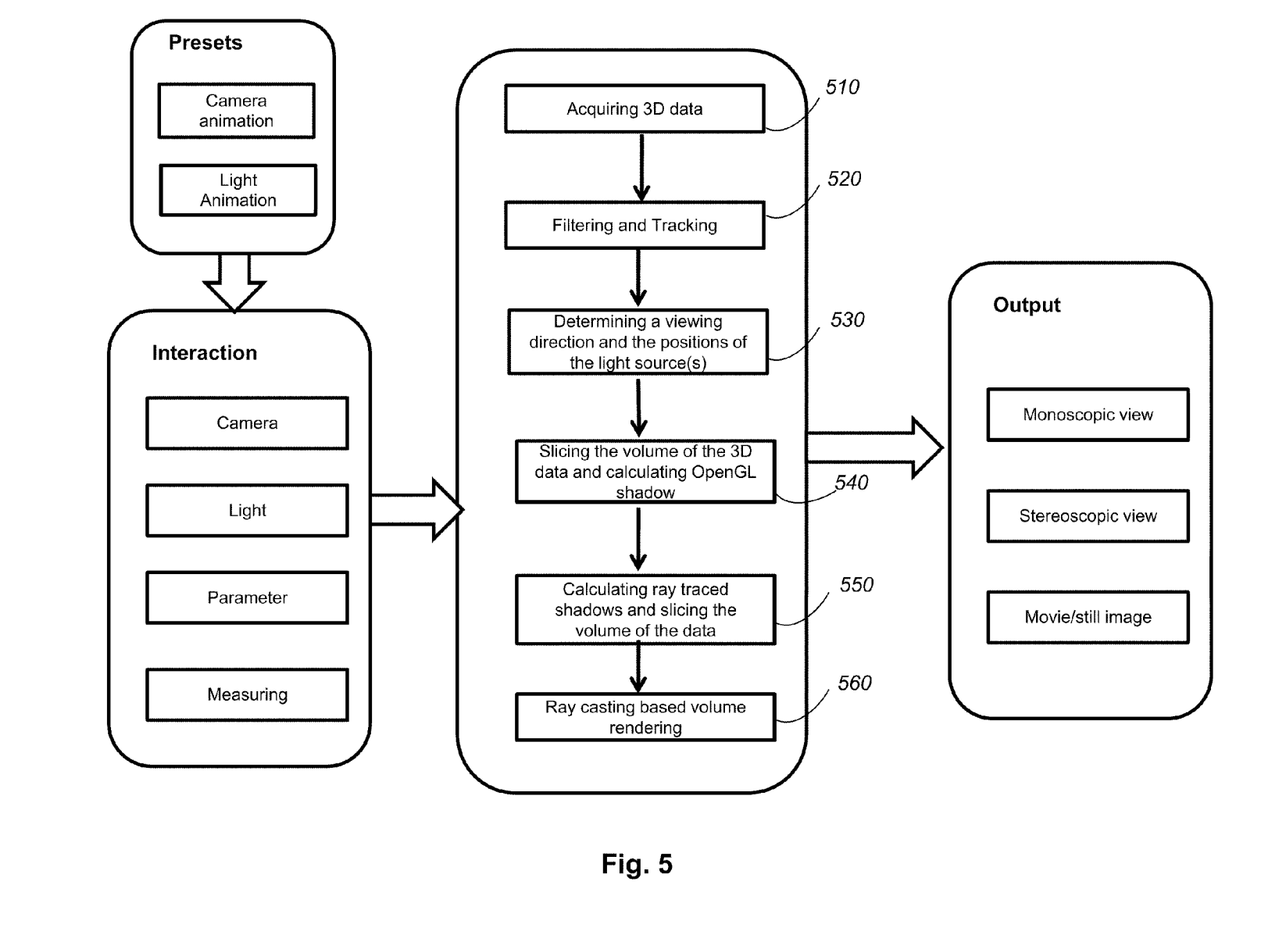
FIG. 5 is a flowchart showing an operation of a method for performing a volume rendering of a 3D array of image data using shadow calculation according to yet another illustrated embodiment of the present invention

FIG. 5 is a flowchart showing an operation of a method for performing a volume rendering of a 3D array of image data using shadow calculation according to yet another illustrated embodiment of the present invention. After the 3D data set is acquired (step 510), the input data are first subjected to filtering and tracking as a pre-processing step (step 520). Smoothing filters, sharpening filters, edge enhancement filters can be implemented in order to enhance the quality of the final image. 2D feature tracking can be used on the input 3D array of image data to detect and reduce scanning errors including translation and rotation. The following steps (steps 530, 540, 550, and 560) will then be performed. The rest of the steps, which are not numerated, have been described in FIG. 4.

Figure 6:
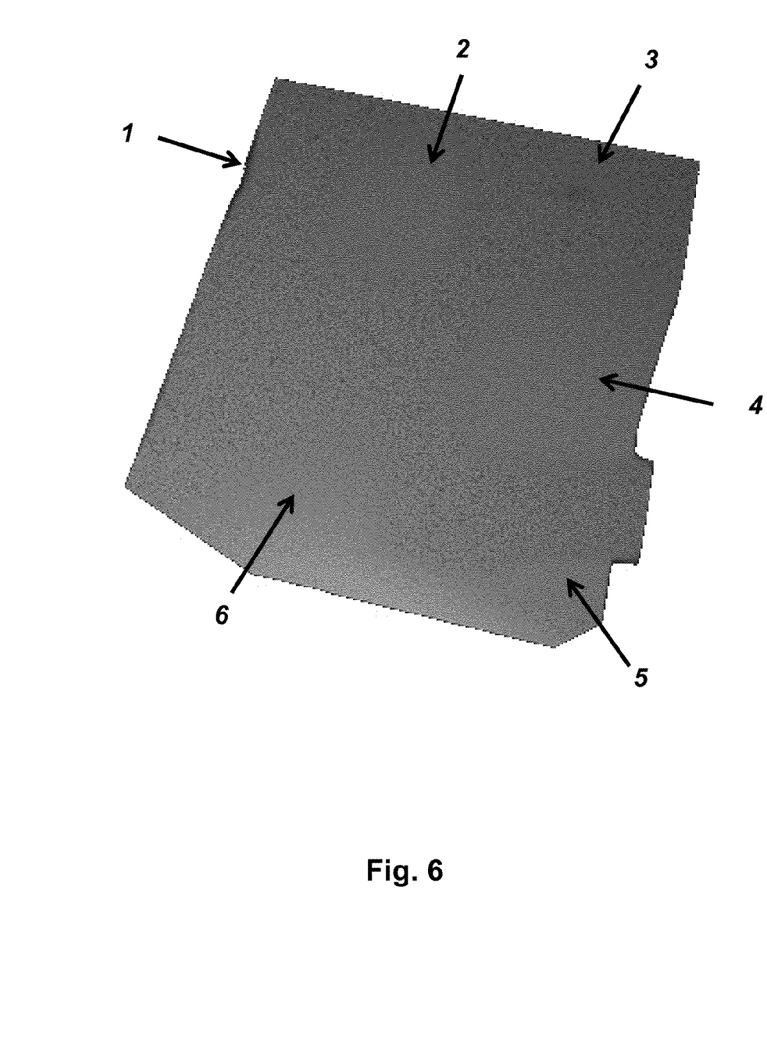
FIG. 6 is an image rendered with a conventional volume rendering method.
Figure 7:
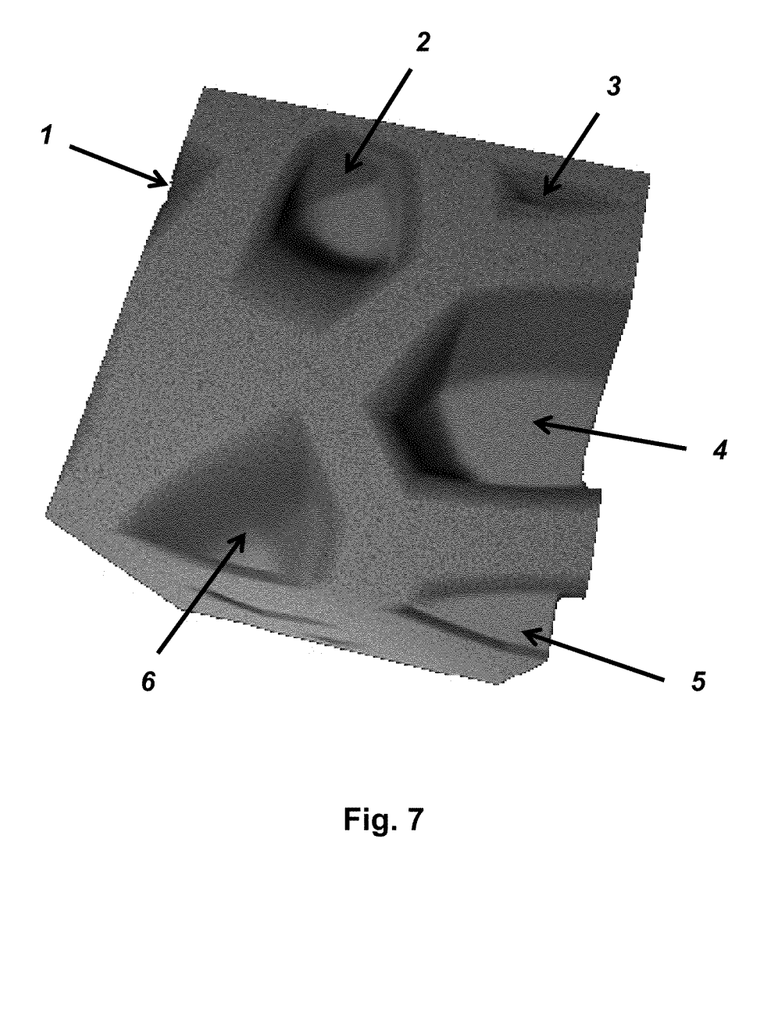
FIG. 7 is an image rendered with a volume rendering method according to the present invention.
Figure 8:
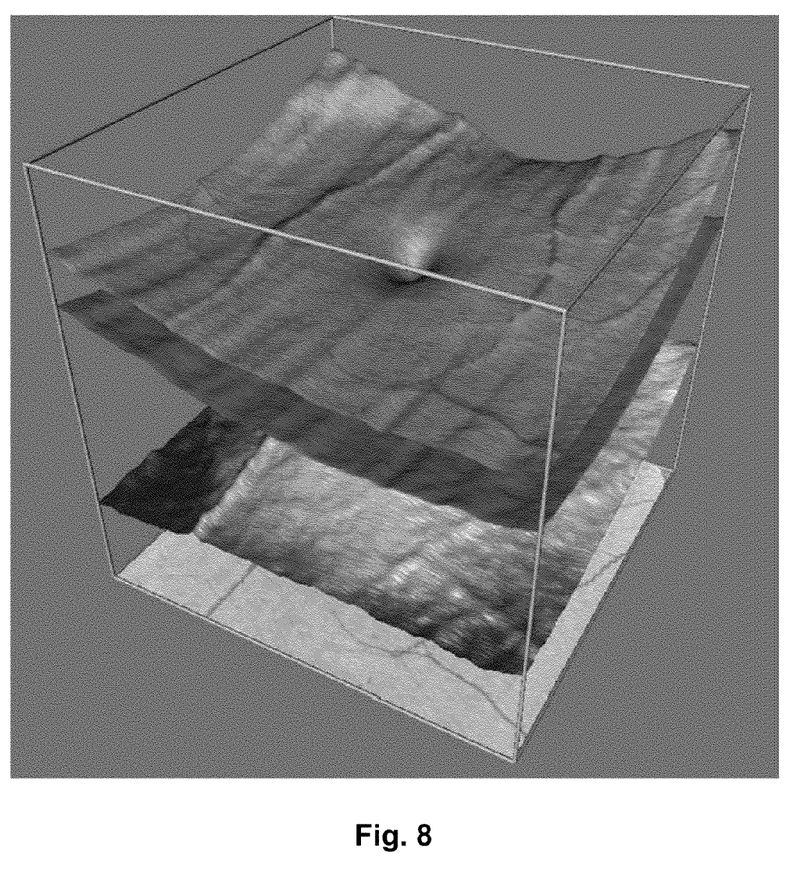
FIG. 8 is an image data calculated by conventional polygon rendering method.
Figure 9:
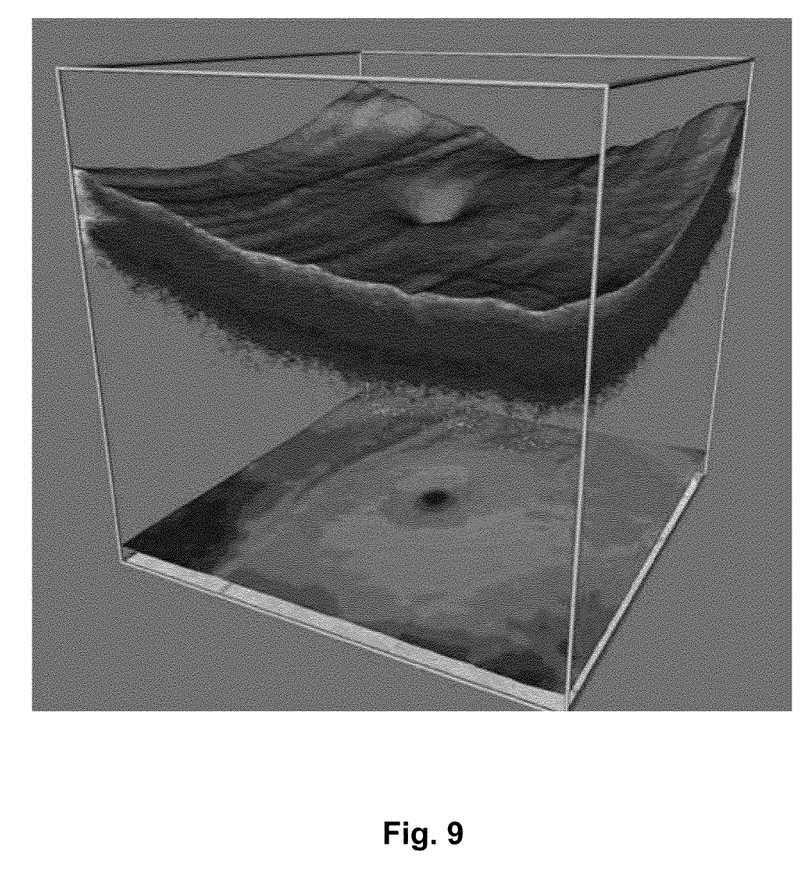
FIG. 9 is a combination of the polygon rendering data and the image data rendered by the volume rendering method described in the current invention. The combination of these two methods enables an integration of further information and objects into the scene.

FIG. 6 is an image rendered with a conventional volume rendering method;

FIG. 7 is an image rendered with a volume rendering method according to the present invention. As can be easily seen by comparing the images in FIG. 6 and in FIG. 7, the image generated using the present invention, which incorporates shadow calculation in the method renders much more spatial information as opposed to the image generated by the conventional volume rendering method, wherein all of the spatial information (1-6) disappears due to noises.

It should be understood that the above description is only representative of illustrative embodiments. For the convenience of the reader, the above description has focused on a representative sample of possible embodiments, a sample that is illustrative of the principles of the invention. Other applications and embodiments can be straightforwardly implemented without departing from the spirit and scope of the present invention. It is therefore intended, that the invention not be limited to the specifically described embodiments, because numerous permutations and combinations of the above and implementation involving non-inventive substitutions for the above can be created, but the invention is to be defined in accordance with the claims that follow. It can be appreciated that many of these un-described embodiments are within the literal scope of the following claims, and that others are equivalent.

The invention claimed is:

1. A method for performing a volume rendering of a 3D array of image data using shadow calculation, the method comprising the steps of:
receiving the 3D array of image data;
determining a viewing direction and position of a light source;
depending on the position of the light source, automatically selecting a shadow-calculation method comprising ray casting or texture-based volume rendering;
determining a number of slices to use;
slicing the array of image data into the determined number of slices with the slices either perpendicular to the viewing direction, perpendicular to a bisector between the viewing direction and the direction of light from the source, or perpendicular to a bisector between the mirrored viewing direction and the light direction;
calculating shadows if the position of the light source moves or if the shadow-calculation method has been changed;
rendering the slices with ray casting or texture-based volume rendering and incorporating the shadows determined by the latest shadow calculation independent of the rendering method by which they were calculated; and
displaying the rendered data on a screen of a display device using ray casting and/or texture-based volume rendering.

2. The method defined in claim 1, further comprising the step of acquiring the 3D array of image data.

3. The method defined in claim 2 wherein the image data are acquired by one of the techniques including a computed tomographic (CT), helical CT, optical coherence tomography (OCT), spectral-domain optical coherence tomography (SD-OCT), x-ray, positron emission tomographic (PET), fluoroscopic, confocal microscopic, ultrasound, and magnetic resonance (MR) imaging technique.

4. The method defined in claim 1, further comprising the step, during rendering of the slices, of:
mapping the colors of a selected gradient to the grey scale values of the new images.

5. The method defined in claim 1, wherein the image data loaded for volume rendering are in different formats including DICOM, movies, image sequences.

6. The method defined in claim 1, wherein Boolean operations are used for modifying slices.

7. The method defined in claim 1, further comprising the step of:
dynamically adapting the number of the slices to reach a defined frame rate.

8. The method defined in claim 1, wherein there are multiple light sources whose positions are calculated.

9. The method defined in claim 1, wherein the rendered data is displayed as a real time monoscopic view, a real time stereoscopic view, a movie or a still image.

10. The method defined in claim 1, wherein the viewing direction, the position of the light source, and other parameters including colors and desired quality of the final presentation can be determined and adjusted by the user through a user interface.

11. The method defined in claim 1, further comprising the step of
subjecting the input 3D array of image data to filtering to enhance the quality of the presentation.

12. The method defined in claim 1, further comprising the step of subjecting the input 3D array of image data tracking to detect and reduce scanning errors including translation and rotation.

13. The method defined in claim 1, wherein certain parameters including the position of the light source and the viewing direction can be set by presets to allow for functions such as automated turntable animations.

14. A system for performing a volume rendering of a 3D array of image data using shadow calculation, the system comprising:
a memory device for storing a program;
at least one processor in communication with the memory device and operative with the program to:
receive the 3D array of image data;
determine a viewing direction and position of a light source;
depending on the a position of the light source, automatically select a shadow-calculation method comprising ray casting or texture-based volume rendering;
determine a number of slices to use;
slice the array of image data into the determined number of slices with the slices either perpendicular to the viewing direction, perpendicular to a bisector between the viewing direction and the light direction, or perpendicular to a bisector between the mirrored viewing direction and the light direction;
calculate shadows if the position of the light source moves or if the shadow-calculation method has been changed;
render the slices with ray casting or texture-based volume rendering and incorporating the shadows determined by the latest calculation independent of the rendering method by which they were calculated; and
a display in communication with the processor for displaying the rendered data in ray casting and/or texture-based volume rendering.

15. The system defined in claim 14, wherein the processor is a graphics-processing unit and/or a central-processing unit.

16. The system defined in claim 14, wherein the processor is further operative with program code to map the colors of a selected gradient to grey scale values of the new images during rendering of the slices.

17. The system defined in claim 14, wherein the processor is further operative with program code to acquire the 3D volume of image data.

18. The system defined in claim 17, wherein the image data are acquired by one of the methods including a computed tomographic (CT), helical CT, optical coherence tomography (OCT), spectral-domain optical coherence tomography (SD-OCT), x-ray, positron emission tomographic (PET), fluoroscopic, confocal microscopic, ultrasound, and magnetic resonance (MR) imaging technique.

19. The system defined in claim 14, wherein the image data loaded for volume rendering are in different formats including DICOM, Movies, Image sequences.

20. The system defined in claim 14 wherein Boolean operations are used for modifying slices.

21. The system defined in claim 14 wherein the number of the slices is adapted to reach a defined frame rate.

22. The system defined in claim 14, wherein there are multiple light sources whose positions are calculated.

23. The system defined in claim 14 wherein the rendered data is displayed as a real time monoscopic view, a real time stereoscopic view, a movie or a still image.

24. The system defined in claim 14 wherein the viewing direction, the position of the light source, and other parameters including colors and desired quality of the final presentation can be determined and adjusted by the user though a user interface.

25. The system defined in claim 14 wherein the processor is further operative with the program code to subject the input 3D array of image to data filtering to enhance the quality of the presentation.

26. The system defined in claim 14 wherein the processor is further operative with the program code to subject the input 3D array of image data to tracking to detect and reduce scanning errors including translation and rotation.

27. The system defined in claim 14 wherein certain parameters including the position of the light source and the viewing direction can be set by presets to allow for functions such as automated turntable animations.

28. A non-transitory computer readable medium having computer program logic recorded thereon for performing on a processor a volume rendering of a 3D array of image data using shadow calculation, the computer program logic comprising:
  receiving the 3D array of image data;
  determining a viewing direction and position of a light source;
  depending on the position of the light source, automatically selecting a volume-rendering method comprising ray casting or texture-based volume rendering;
  determining a number of slices to use;
  slicing the array of image data into the determined number of slices with the slices either perpendicular to the viewing direction, perpendicular to the bisector between the viewing direction and the light direction, or perpendicular to the bisector between the mirrored viewing direction and the light direction;
  calculating ray traced shadows with a position of a light source being used either fixed or movable;
  rendering the slices with ray casting or texture-based volume rendering and incorporating the shadows determined by the latest shadow calculation independent of the rendering method by which they were calculated; and
  displaying the rendered data on a screen with ray casting and/or texture-based volume rendering.

29. A computer-based system for performing a volume rendering of a 3D array of image data using shadow calculation, the system comprising:
  means for receiving the 3D array of image data;
  means for determining a viewing direction and position of a light source;
  means for, depending on the position of the light source, automatically selecting a shadow-calculation method comprising ray casting or texture-based volume rendering;
  means for determining a number of slices to use;
  means for slicing the array of image data into the determined number of slices with the slices either perpendicular to the viewing direction, perpendicular to a bisector between the viewing direction and the direction of light from the source, or perpendicular to a bisector between the mirrored viewing direction and the light direction;
  means for calculating shadows if the position of the light source moves or if the volume-rendering method has been changed;
  means for rendering the slices with ray casting or texture-based volume rendering and incorporating the shadows determined by the latest shadow calculation independent of the rendering method by which they were calculated; and
  means for displaying the rendered data on a screen of a display device with ray casting and/or texture-based volume rendering.

* * * * *